United States Patent
Liu et al.

(10) Patent No.: US 10,796,408 B2
(45) Date of Patent: Oct. 6, 2020

(54) VARIABLE RESOLUTION RENDERING OF OBJECTS BASED ON USER FAMILIARITY

(71) Applicant: International Business Machines Corporation, Armonk, NY (US)

(72) Inventors: Su Liu, Austin, TX (US); Inseok Hwang, Austin, TX (US); Eric Rozner, Austin, TX (US); Kanak B. Agarwal, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1 day.

(21) Appl. No.: 16/052,854

(22) Filed: Aug. 2, 2018

(65) Prior Publication Data

US 2020/0043132 A1 Feb. 6, 2020

(51) Int. Cl.
| | |
|---|---|
| *G06T 3/40* | (2006.01) |
| *G06K 9/62* | (2006.01) |
| *G06K 9/00* | (2006.01) |
| *G06F 3/01* | (2006.01) |
| *G06N 3/08* | (2006.01) |
| *G06N 3/04* | (2006.01) |

(52) U.S. Cl.
CPC .......... *G06T 3/40* (2013.01); *G06K 9/00677* (2013.01); *G06K 9/6256* (2013.01); *G06F 3/013* (2013.01); *G06N 3/04* (2013.01); *G06N 3/08* (2013.01); *G06T 2210/36* (2013.01)

(58) Field of Classification Search
None
See application file for complete search history.

(56) References Cited

U.S. PATENT DOCUMENTS

| | | | |
|---|---|---|---|
| 5,864,342 A | 1/1999 | Kajiya et al. | |
| 5,977,977 A | 11/1999 | Kajiya et al. | |
| 9,419,966 B2 | 8/2016 | Natividad | |
| 9,542,930 B2 | 1/2017 | Gupta | |
| 2013/0024113 A1* | 1/2013 | Weng | G01C 21/3638 701/455 |
| 2013/0024545 A1* | 1/2013 | Sheppard | G06T 9/001 709/217 |
| 2014/0003716 A1* | 1/2014 | Fedorovskaya | G06K 9/00677 382/170 |
| 2015/0046496 A1* | 2/2015 | Karmarkar | G09B 7/00 707/798 |
| 2017/0011538 A1* | 1/2017 | Singh | G06F 3/147 |
| 2019/0220694 A1* | 7/2019 | Biswas | G06K 9/4604 |

OTHER PUBLICATIONS

D. Chae et al., "CloudSwap: A Cloud-Assisted Swap Mechanism for Mobile Devices", 2016 16th IEEE/ACM International Symposium on Cluster, Cloud, and Grid Computing, 2016, pp. 462-472.

(Continued)

*Primary Examiner* — Yi Wang
(74) *Attorney, Agent, or Firm* — Kunzler Bean & Adamson (57) ABSTRACT

For variable resolution rendering of objects, a processor determines an aggregate familiarity of a user with an object based on at least one of a common familiarity of the object, a content-specific familiarity of the user with the object, and a subjective familiarity of the user with the object. The processor further, in response to the aggregate familiarity satisfying a render policy, reduces a render resolution of the object.

14 Claims, 10 Drawing Sheets

(56) References Cited

OTHER PUBLICATIONS

C. Diaz et al. "Designing for Depth Perceptions in Augmented Reality", http://www.danszafir.com/papers/ISMAR17-Szafir.pdf, Oct. 9-13, 2017, pp. 1-12.
K. Boos et al., "FlashBack: Immersive Virtual Reality on Mobile Devices via Rendering Memoization", ACM MobiSys'16, Jun. 25-30, 2016, Singapore, pp. 1-13.
K. Salisbury et al., "Haptic Rendering: Introductory Concepts", Published by the IEEE Computer Society, Jan. 2004, pp. 24-32.
S. Kochhar, "Object-Oriented Paradigms for Graphical-Object Modeling in Computer-Aided Design: A Survey and Analysis", Proceedings of Graphics Interface'94, Banff, Canada, May 16-20, 1994, pp. 120-132.

\* cited by examiner

VARIABLE RESOLUTION RENDERING OF OBJECTS BASED ON USER FAMILIARITY

FIELD

The subject matter disclosed herein relates to rendering objects and more particularly relates to variable resolution rendering of objects based on user familiarity.

BACKGROUND

Virtual objects are often rendered in real time.

BRIEF SUMMARY

An apparatus for variable resolution rendering of objects based on user familiarity is disclosed. The apparatus includes a processor and a computer readable storage media storing code executable by the processor. The processor determines an aggregate familiarity of a user with an object based on at least one of a common familiarity of the object, a content-specific familiarity of the user with the object, and a subjective familiarity of the user with the object. The processor further, in response to the aggregate familiarity satisfying a render policy, reduces a render resolution of the object. A method and computer program product also perform the functions of the method.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

The computer program product may be deployed by manually loading directly in the client, server and proxy computers via loading a computer readable storage medium such as a CD, DVD, etc., the computer program product may be automatically or semi-automatically deployed into a computer system by sending the computer program product to a central server or a group of central servers. The computer program product is then downloaded into the client computers that will execute the computer program product. Alternatively the computer program product is sent directly to the client system via e-mail. The computer program product is then either detached to a directory or loaded into a directory by a button on the e-mail that executes a program that detaches the computer program product into a directory. Another alternative is to send the computer program product directly to a directory on the client computer hard drive. When there are proxy servers, the process will, select the proxy server code, determine on which computers to place the proxy servers' code, transmit the proxy server code, then install the proxy server code on the proxy computer. The computer program product will be transmitted to the proxy server and then it will be stored on the proxy server.

The computer program product may be integrated into a client, server and network environment by providing for the computer program product to coexist with applications, operating systems and network operating systems software and then installing the computer program product on the clients and servers in the environment where the computer program product will function.

In one embodiment software is identified on the clients and servers including the network operating system where the computer program product will be deployed that are required by the computer program product or that work in conjunction with the computer program product. This includes the network operating system that is software that enhances a basic operating system by adding networking features.

In one embodiment, software applications and version numbers are identified and compared to the list of software applications and version numbers that have been tested to work with the computer program product. Those software applications that are missing or that do not match the correct version will be upgraded with the correct version numbers. Program instructions that pass parameters from the computer program product to the software applications will be checked to ensure the parameter lists match the parameter lists required by the computer program product. Conversely parameters passed by the software applications to the computer program product will be checked to ensure the parameters match the parameters required by the computer program product. The client and server operating systems including the network operating systems will be identified and compared to the list of operating systems, version numbers and network software that have been tested to work with the computer program product. Those operating systems, version numbers and network software that do not match the list of tested operating systems and version numbers will be upgraded on the clients and servers to the required level.

In response to determining that the software where the computer program product is to be deployed, is at the correct version level that has been tested to work with the computer program product, the integration is completed by installing the computer program product on the clients and servers.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The description of elements in each figure may refer to elements of proceeding figures. Like numbers refer to like elements in all figures, including alternate embodiments of like elements.

Figure 1A:
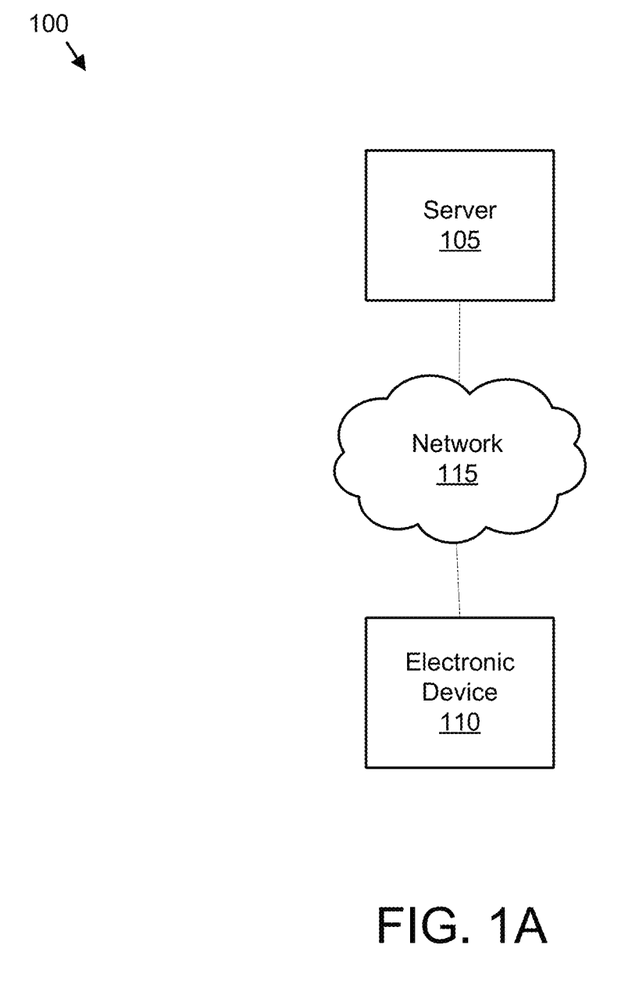
FIG. 1A is a schematic block diagram illustrating one embodiment of an object rendering system.

FIG. 1A is a schematic block diagram illustrating one embodiment of an object rendering system 100. The system 100 includes an electronic device 110. The electronic device 110 renders images and/or virtual objects, referred to hereafter as objects, for a user. In one embodiment, the electronic device 110 communicates with a server 105 through a network 115. The network 115 is the Internet, a wide-area network, a mobile telephone network, a Wi-Fi network, a local area network, or combinations thereof. In a certain embodiment, the server 105 communicates object geometries, shading, transparency, color, and texture, referred to hereafter as object appearance, to the electronic device 110 and the electronic device 110 renders the object 125 in order to present the corresponding objects. In an alternate embodiment, the electronic device 110 generates the object appearance.

Rendering an object requires significant computing resources. The computing resource requirements for rendering all objects 125 may occasionally outstrip the capabilities of the electronic device 110. In addition, the computing resource requirements may generate significant heat, often in the vicinity of a user of the electronic device.

The embodiments reduce a render resolution of an object based on a render policy in order to reduce the required computing resources for rendering the object. The embodiments take advantage of the user's brain's ability to generate object features that are not perceived by the eyes but that are familiar to the brain. In particular, the embodiments employ one or more of a common familiarity of the user with the object, a content-specific familiarity of the user with the object, and a subjective familiarity of the user with the object in order to reduce the render resolution of the object as will be described hereafter. The embodiments rely on the user's brain to add details that are not rendered to familiar objects. As a result, the familiar objects can be rendered with less resolution and computing resources for rendering the familiar objects may be reduced or conserved, improving the efficiency and the efficacy of the electronic device 110.

Figure 1B:
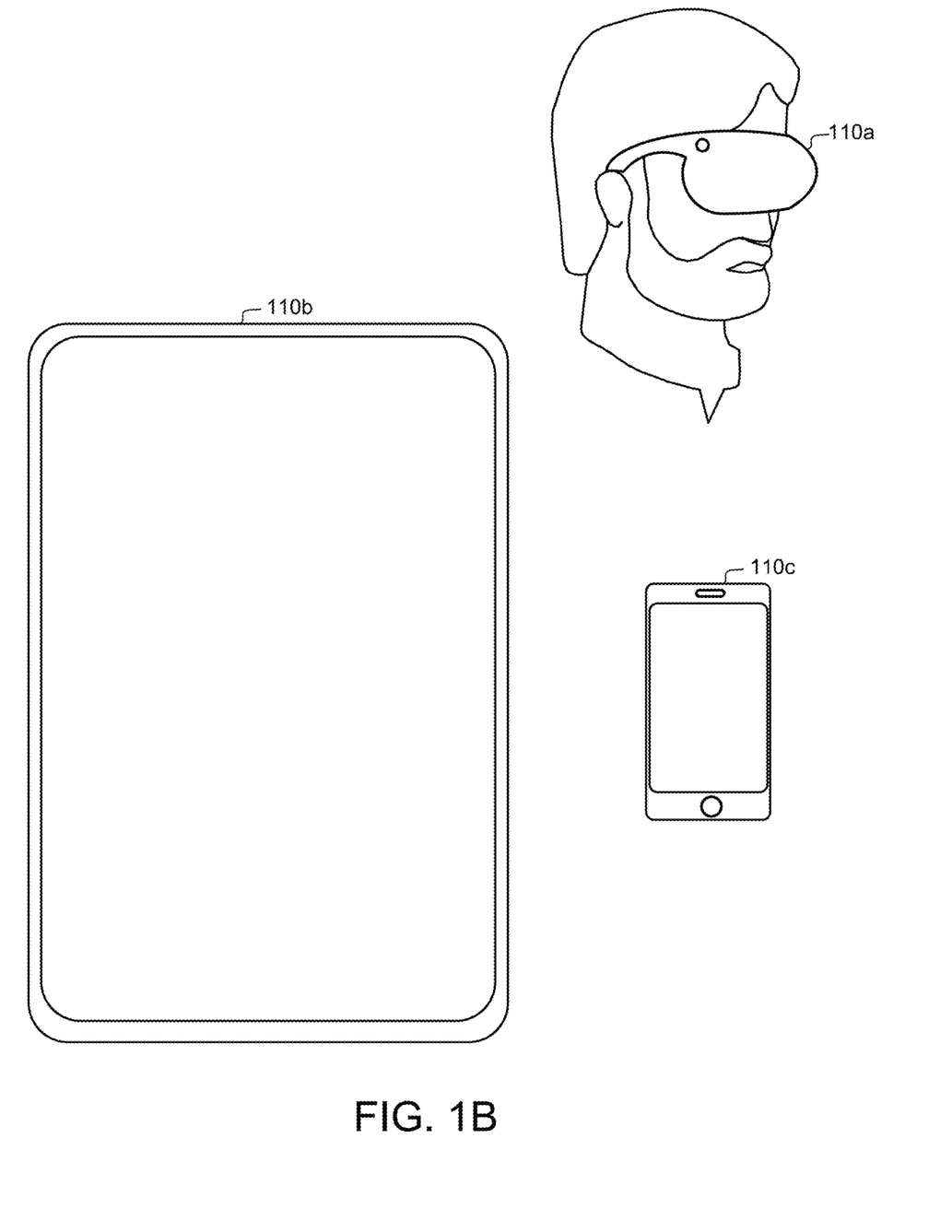
FIG. 1B is drawings of embodiments of electronic devices.

FIG. 1B includes drawings of embodiments of electronic devices 110. In the depicted embodiment, a virtual-reality goggle electronic device 110a, a tablet computer electronic device 110b, and a mobile telephone electronic device 110c are shown. Each of the electronic devices 110 presents images including rendered object appearances of one or more objects to the user.

Figure 2:
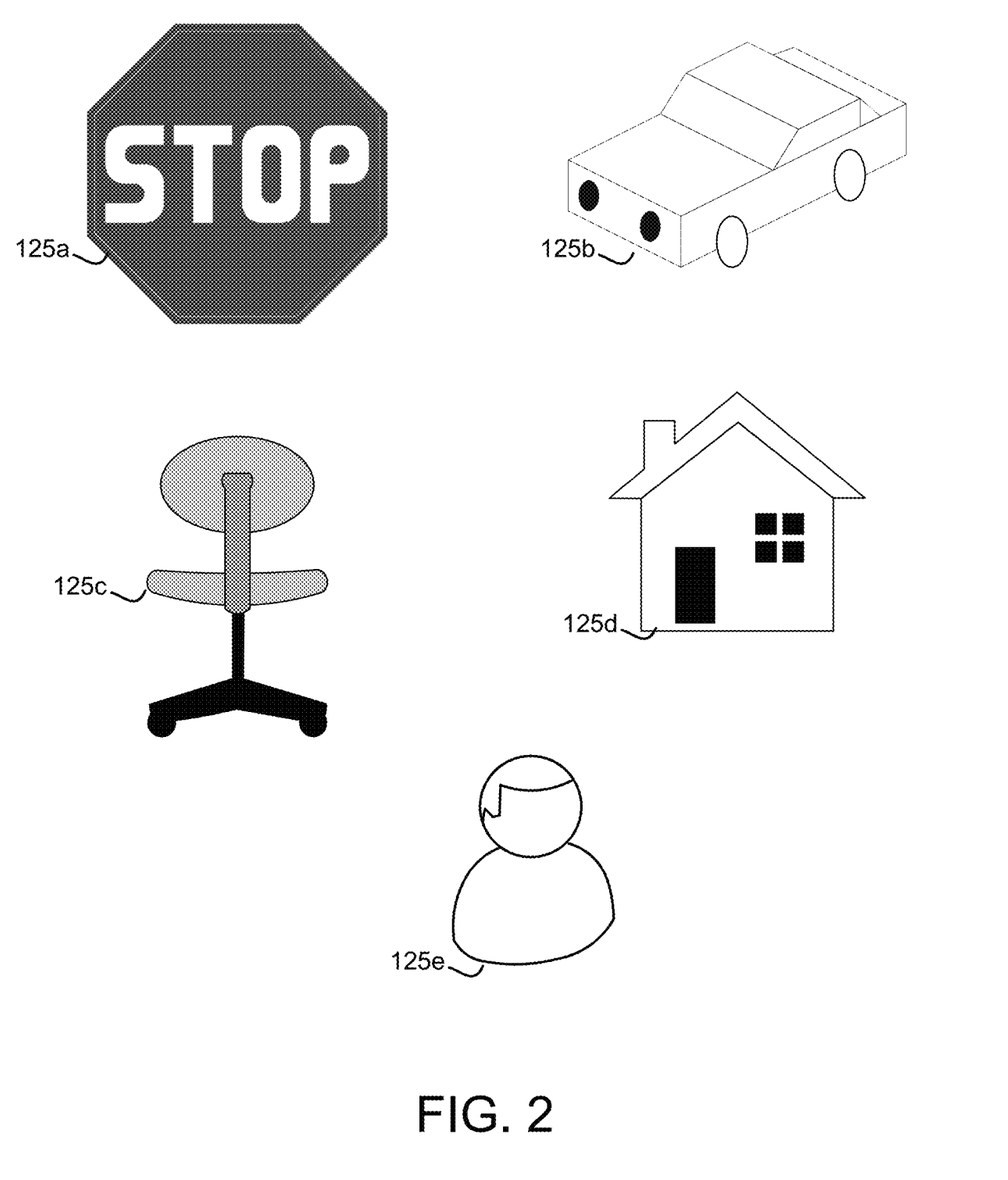
FIG. 2 is illustrations of embodiments of objects.

FIG. 2 includes illustrations of embodiments of objects 125. The objects 125 are comprised of one or more polygons such as one or more triangles. In one embodiment, the objects 125 are overlaid with one or more texture maps to provide photorealism.

In one embodiment, the objects 125 are familiar to the user. The familiarity may be one or more of common familiarity, content-specific familiarity, and subjective familiarity. Objects 125 with common familiarity are generally familiar to most users. For example, a stop sign object 125a or a chair object 125c is familiar to most users. Objects 125 with subjective familiarity are familiar to one specific user. For example, the user is subjectively familiar with her own car object 125b or house object 125d.

In a certain embodiment, the user develops content-specific familiarity with an object 125 over time. For example, the user may initially be unfamiliar with a face object 125e, but develop content-specific familiarity through exposure to the face object 125e over a time interval.

The user's familiarity with any given object 125 may be a combination of one or more of the common familiarity, the content-specific familiarity, and the subjective familiarity of the user with the object 125, referred to hereafter as aggregate familiarity. In a certain embodiment, each of common familiarity, content-specific familiarity, and subjective familiarity may be a factor for the aggregate familiarity of a given object 125. For example, the user may have common familiarity with car objects 125b in general, subjective familiarity toward her own car object 125b, and content-specific familiarity with the car object 125b that is rendered by the electronic device 110 over a time interval. The embodiments employ the aggregate familiarity of the user to determine when the render resolution of the object 125 can be reduced as will be described hereafter.

Figure 3A:
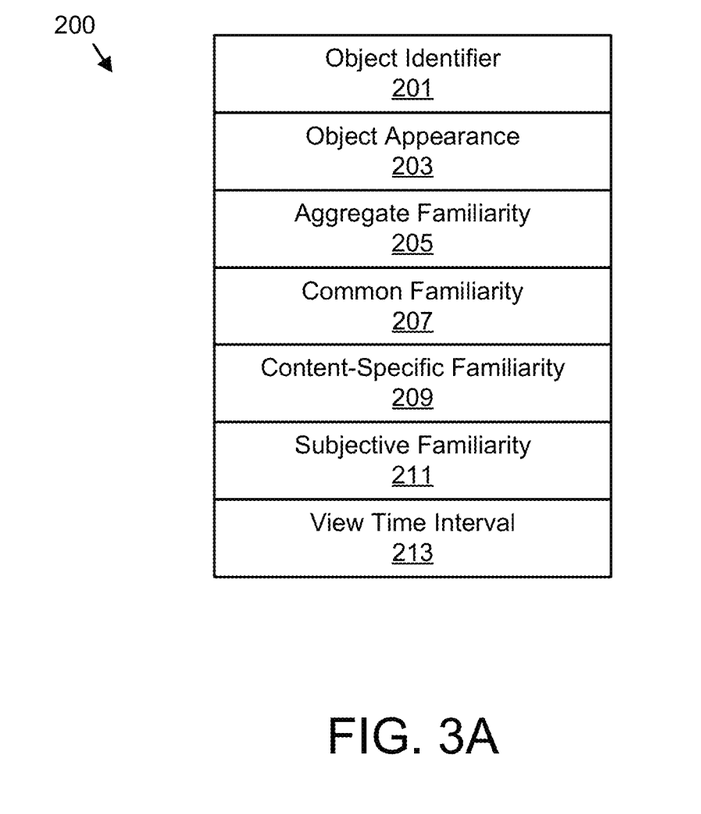
FIG. 3A is a schematic block diagram illustrating one embodiment of object data.

FIG. 3A is a schematic block diagram illustrating one embodiment of object data 200. In a certain embodiment, the object data 200 is organized as a data structure in a memory. In the depicted embodiment, the object data 200 includes an object identifier 201, an object appearance 203, an aggregate familiarity 205, a common familiarity 207, a content-specific familiarity 209, a subjective familiarity 211, and a view time interval 213.

The object identifier 201 may uniquely identify the object 125. In a certain embodiment, the object appearance 203 describes the one or more polygons that form the object 125. In one embodiment, the object 125 is described by varying numbers of polygons. For example, the object 125 is described with the large number of polygons for a fine render resolution and is described with a small number of polygons for a course render resolution. In a particular embodiment, the object appearance 203 describes one or more texture maps that overlay the object 125. In a certain embodiment, the object appearance 203 includes detailed texture maps for a fine render resolution and course texture maps for a course render resolution.

The aggregate familiarity 205 is determined as a function of the common familiarity 207, the content-specific familiarity 209, and the subjective familiarity 211. In one embodiment, the aggregate familiarity AF 205 is a weighted average of the common familiarity CF 207, the content-specific familiarity CSF 209, and the SF subjective familiarity 211 as shown in Equation 1, where k, l, and m are nonzero constants.

$$AF = kCF + lCSF + mSF \quad \text{Equation 1}$$

In one embodiment, the common familiarity 207 is determined by recognizing the object 125 with the standard object model and assigning the object 125 a common familiarity value associated with the object 125 for the standard object model as will be described hereafter in FIG. 5C.

In one embodiment, the view time interval 213 records how long the user has viewed the object 125 as presented by the electronic device 110. In a certain embodiment, the view time interval 213 records how long the object 125 is within an area of interest of the user as presented by the electronic device 110. The area of interest may be determined by eye tracking.

In one embodiment, the content-specific familiarity 209 is calculated as a function of the view time interval VTI 213. In a certain embodiment, the content-specific familiarity CSF 209 is calculated using Equation 2, where j and h are a nonzero constants.

$$CSF = \max(jVTI^2, h) \quad \text{Equation 2}$$

In one embodiment, the subjective familiarity 211 is determined from images related to the user as will be described hereafter in FIG. 5B. In one embodiment, the subjective familiarity 211 is a binary value. In an alternative embodiment, the subjective familiarity 211 is a confidence percentage.

Figure 3B:
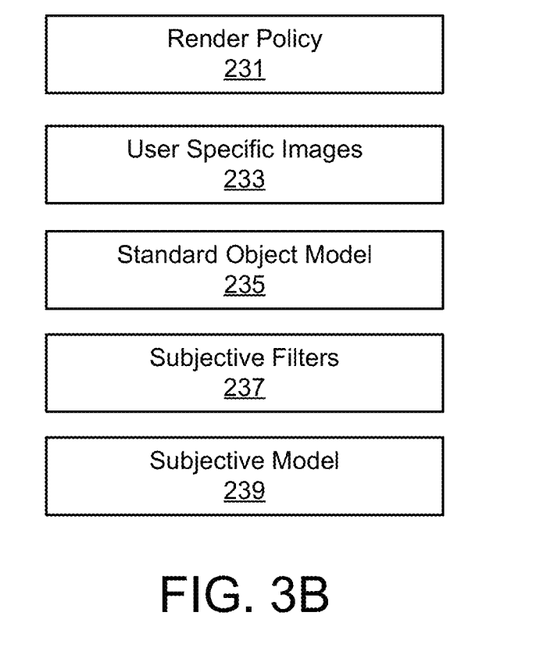
FIG. 3B is a schematic block diagram illustrating one embodiment of system data.

FIG. 3B is a schematic block diagram illustrating one embodiment of system data. In one embodiment, the system data is organized as a data structure in a memory. In the depicted embodiment, the system data includes a render policy 231, user specific images 233, a standard object model 235, subjective filters 237, and a subjective model 239.

The render policy 231 specifies the conditions for reducing the render resolution of the object 125. The embodiments reduce the render resolution of the object 125 in response to the render policy 231 being satisfied.

In one embodiment, the user specific images 233 are acquired from at least one of a social media site and library images identified from a user profile. The user specific images 233 may include images of family, friends, scenery, buildings, vehicles, personal possessions, and the like associated with the user.

The standard object model 235 is trained to recognize standard objects 125. In a certain embodiment, the standard object model 235 is a neural network as will be described hereafter in FIG. 4B. In one embodiment, a common familiarity value is associated with each object 125 identified by the standard object model 235.

In one embodiment, the subjective filters 237 filter the user specific images 233 from images related to the user. For example, images that are downloaded from a social media account of the user may be filtered with the subjective filters 237 to generate the user specific images 233. In one embodiment, the subjective filters 237 remove objects 125 that are infrequently included in the images. In a certain embodiment, the subjective filters 237 retain objects 125 that are likely to be specific to the user.

The subjective model 239 is trained to recognize the user specific images 233. In one embodiment, the subjective model 239 is a neural network as will be described hereafter in FIG. 4B.

Figure 4A:
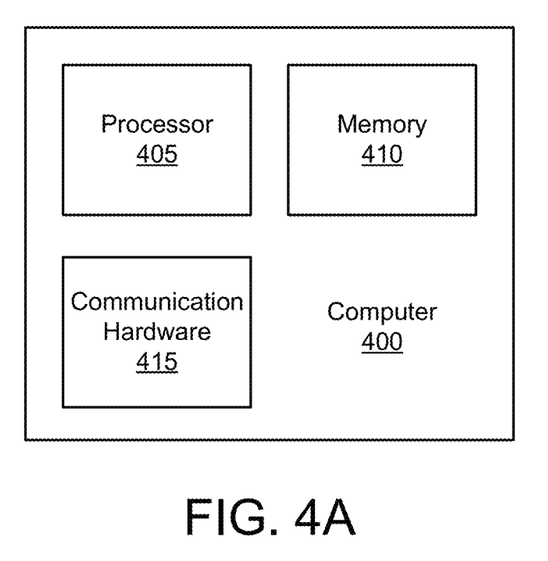
FIG. 4A is a schematic block diagram illustrating one embodiment of a computer.

FIG. 4A is a schematic block diagram illustrating one embodiment of a computer 400. The computer 400 is embodied in one or more of the electronic device 110 and the server 105. In the depicted embodiment, the computer 400 includes a processor 405, a memory 410, and communication hardware 415. The memory 410 includes one or more of a semiconductor storage device, hard disk drive, an optical storage device, a micromechanical storage device, or combinations thereof. The memory 410 stores code. The processor 405 executes the code. The communication hardware 415 communicates with other devices. For example, the communication hardware 415 may communicate with the network 115.

Figure 4B:
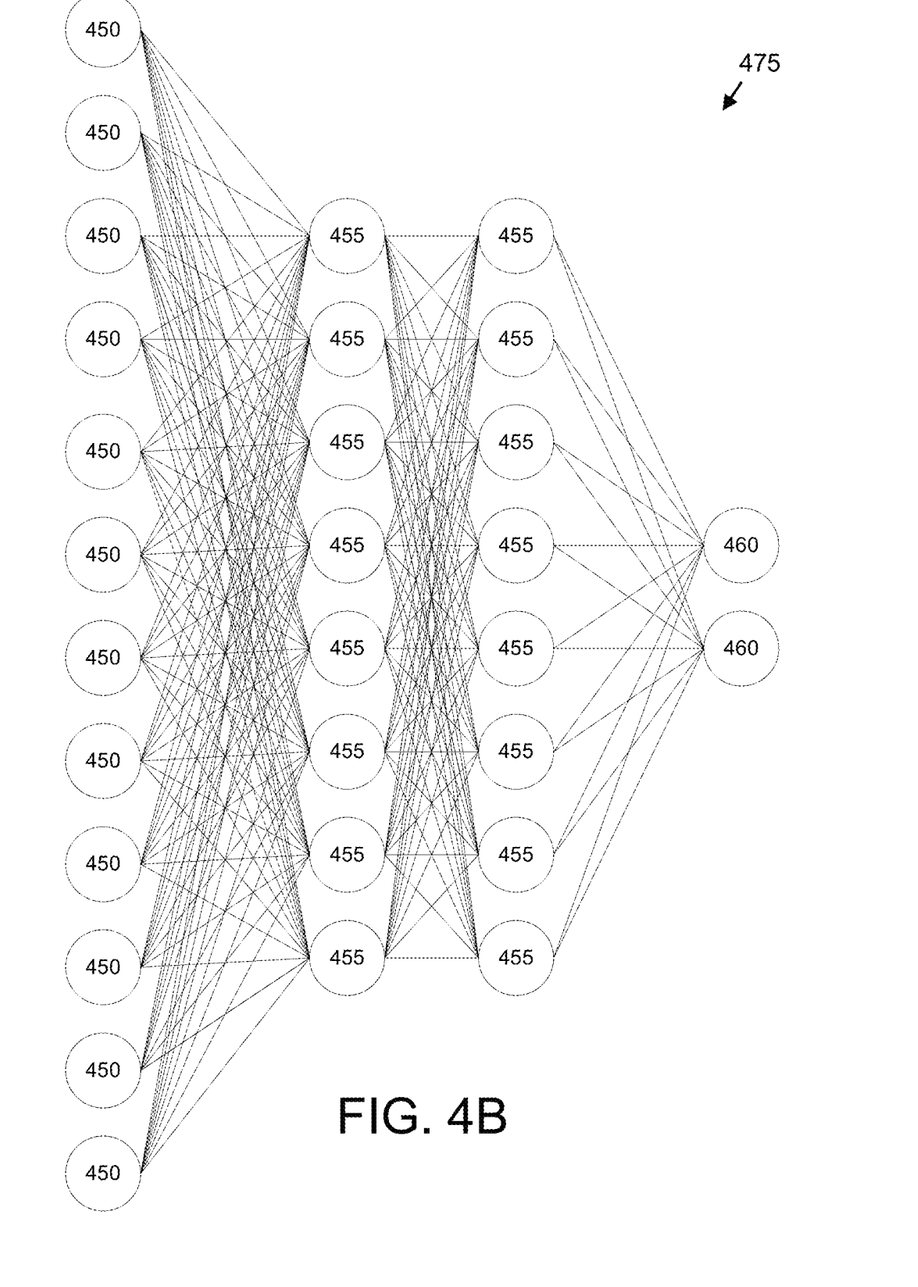
FIG. 4B is a schematic diagram illustrating one embodiment of a neural network.

FIG. 4B is a schematic block diagram illustrating one embodiment of a neural network 475. In the depicted embodiment, the neural network 475 includes input neurons 450, hidden neurons 455, and output neurons 460. The neural network 475 may be organized as a convolutional neural network, a recurrent neural network, and the like.

The neural network 475 is trained with training data. In one embodiment, the training data includes common objects 125 and associated common familiarity values. In a certain embodiment, the training data includes user specific images 233. The neural network 475 is trained using one or more learning functions while applying the training data to the input neurons 450 and known result values for the output neurons 460. Subsequently, the neural network 465 receives actual data at the input neurons 450 and makes predictions at the output neurons 460 based on the actual data. In one embodiment, the actual data is the object 125.

Figure 5A:
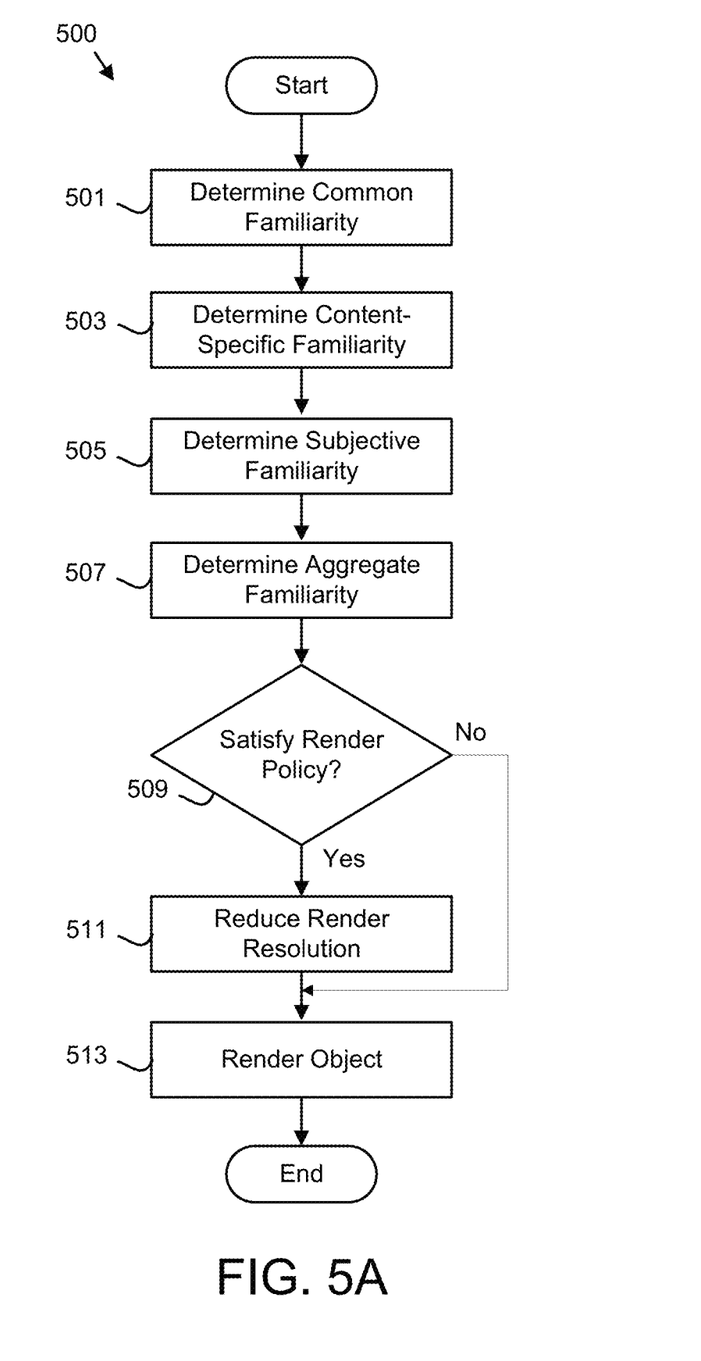
FIG. 5A is a schematic flow chart diagram illustrating one embodiment of an object rendering method.

FIG. 5A is a schematic flow chart diagram illustrating one embodiment of an object rendering method 500. The method 500 renders the object 125 at the electronic device 110. In addition, the method 500 determines the aggregate familiarity 205 of the user with the object 125 and modifies the render resolution of the object 125 based on the aggregate familiarity 205. In one embodiment, the method 500 is performed by the computer 400 and/or the processor 405 of the computer 400.

The method 500 starts, and in one embodiment, the processor 405 determines 501 the common familiarity 207 of the object 125. The determining 501 of the common familiarity 207 is described in more detail in FIG. 5C. In a certain embodiment, the common familiarity 207 is user independent. In a particular embodiment, the common familiarity 207 is a function of user characteristics such as nationality, age, and occupation.

In one embodiment, the processor 405 determines 503 the content-specific familiarity 209 of the user with the object 125. In a particular embodiment, the processor 405 calculates the view time interval 213 for the object 125 and further calculates the content-specific familiarity 209 based on the view time interval 213. In a certain embodiment, the processor 405 calculates the content-specific familiarity using Equation 2.

In one embodiment, the processor 405 determines 505 the subjective familiarity 211 of the user with the object 125. In a certain embodiment, the determining 505 of the subjective familiarity 211 is described in more detail in FIG. 5B.

In one embodiment, the processor 405 determines 507 the aggregate familiarity 205 of the object 125. The aggregate familiarity 205 is based on at least one of the common familiarity 207, the content-specific familiarity 209, and the subjective familiarity 211. In a certain embodiment, the aggregate familiarity 205 is calculated using Equation 1.

In one embodiment, the processor 405 determines 509 if the aggregate familiarity 205 satisfies the render policy 231. In a certain embodiment, the aggregate familiarity 205 satisfies the render policy 231 if the aggregate familiarity 205 exceeds an aggregate threshold. In a particular embodiment, the aggregate familiarity 205 satisfies the render policy 231 if one or more of the common familiarity 207 exceeds a common threshold, the content-specific familiarity 209 exceeds a content-specific threshold, and the subjective familiarity 211 exceeds a subjective threshold.

If the aggregate familiarity 205 does not satisfy the render policy 231, the processor 405 renders 513 the object 125 without reducing the render resolution of the object 125 and the method 500 ends. If the aggregate familiarity 205 satisfies the render policy 231, the processor 405 reduces 511 the render resolution of the object 125 and renders 513 the object 125 with the reduced render resolution, and the method 500 ends.

In a certain embodiment, reducing the render resolution of the object 125 comprises one or more of reducing a number of polygons rendering the object 125 and reducing a complexity of texture maps for the object 125. For example, a polygon count for the object 125 may be reduced. In an alternative example, the object 125 may be overlaid with a less detailed texture map.

Figure 5B:
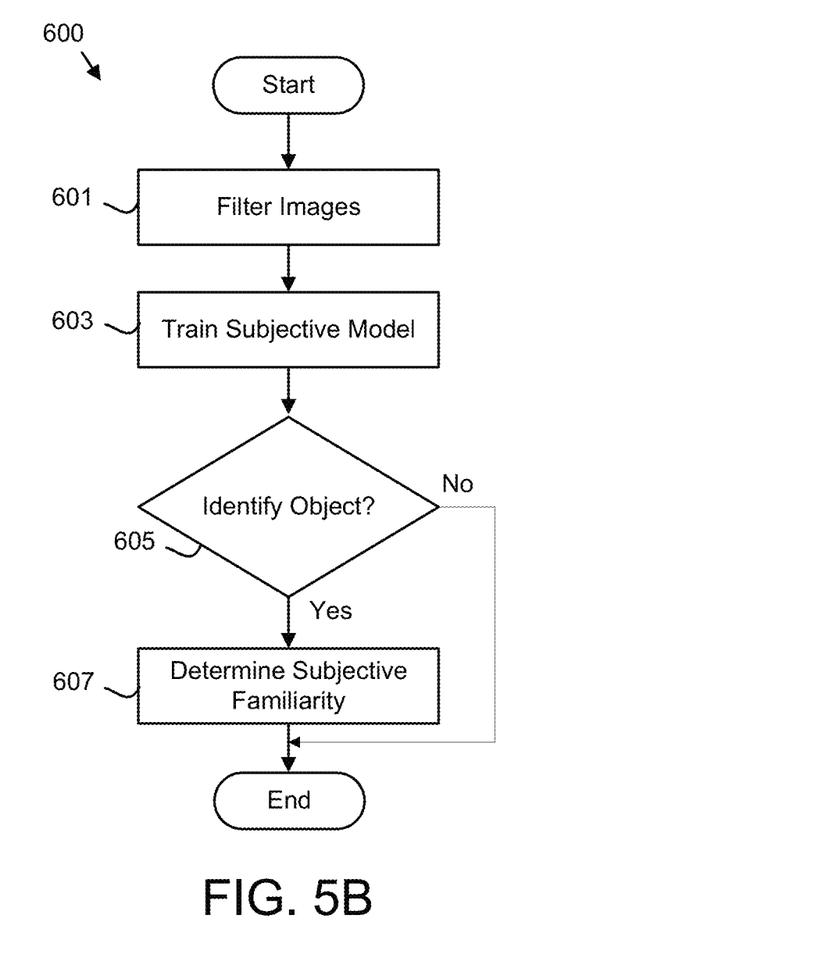
FIG. 5B is a schematic flow chart diagram illustrating one embodiment of a subjective familiarity determination method.

FIG. 5B is a schematic flow chart diagram illustrating one embodiment of a subjective familiarity determination method 600. The method 600 determines the subjective familiarity 211 of the object 125. In a certain embodiment, the method 600 performs step 505 of FIG. 5A. The method 600 is performed by the computer 400 and/or the processor 405 of the computer 400.

The method 600 starts, and in one embodiment, the processor 405 filters 601 images related to the user for the user specific images 233. In a specific embodiment, the processor 405 scrapes images from a social media site for the user. In a certain embodiment, the processor 405 downloads library images identified from a user profile for the user. In a particular embodiment, the processor 405 filters 601 the images with the subjective filters 237 to generate the user specific images 233.

In one embodiment, the processor 405 trains 603 the subjective model 239 with the user specific images 233. For example, the processor 405 may train 603 a neural network subjective model 239 to recognize the user specific images 233.

In one embodiment, the processor 405 attempts to identify 605 the object 125 with the subjective model 239. If the subjective model 239 does not identify 605 the object 125, the method 600 ends without determining subjective familiarity 211. If the subjective model 239 identify 605 the object 125, the processor 405 determines 607 subjective familiarity 211 and the method 600 ends.

Figure 5C:
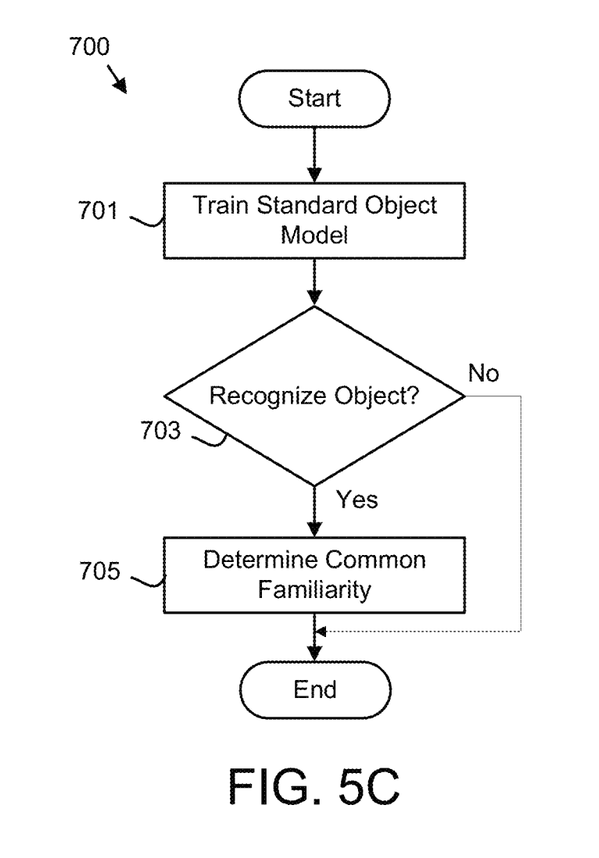
FIG. 5C is a schematic flow chart diagram illustrating one embodiment of a common familiarity determination method.

FIG. 5C is a schematic flow chart diagram illustrating one embodiment of a common familiarity determination method 700. The method 700 determines a common familiarity 207 for the object 125. In one embodiment, the method 700 performs step 501 of FIG. 5A. In a certain embodiment, the method 700 is performed by the computer 400 and/or the processor 405 of the computer 400.

The method 700 starts, and in one embodiment, the processor 405 trains 701 the standard object model 235 with the plurality of common objects 125. In a particular embodiment, the standard object model 235 is specific to a set of user characteristics. In one embodiment, each object 125 is associated with a common familiarity value. For example, a stop sign object 125a may have a higher common familiarity value than a yield sign object 125.

In one embodiment, the processor 405 attempts to recognize 703 the object 125 with the standard object model 235. If the standard object model 235 does not recognize 703 the object 125, the method 700 ends without determining common familiarity 207. If the standard object model 235 recognizes 703 the object 125, the processor 405 determines 705 common familiarity 207. In one embodiment, the processor 405 assigns the object 125 a common familiarity value associated with the object 125 for the standard object model 235.

The embodiments determine the aggregate familiarity 205 of the user with the object 125. If the aggregate familiarity 205 satisfies the render policy 231, the embodiments reduce the render resolution of the object 125 as presented on the electronic device 110. However, because the user is familiar with the object 125, the user's brain restores intermediate object features that were not presented on the electronic device 110. As a result, the viewing experience of the user is minimally impacted, or even un-impacted, while significantly reducing the computational resources of the computer 400 required to render the object 125.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a processor;
a computer readable storage media storing code executable by the processor to:
determine an aggregate familiarity of a user with an object as a weighted sum of a common familiarity of the object, a content-specific familiarity of the user with the object, and a subjective familiarity of the user with the object, wherein the content-specific familiarity is calculated as a function of a view time interval that the object is within an area of interest of the user determined by eye tracking, wherein the content-specific familiarity CSF is calculated as $CSF=\max(jVTI^2, h)$, where VTI is the view time interval and j and h are nonzero constants; and in response to the aggregate familiarity satisfying a render policy, reduce a render resolution of the object.

2. The apparatus of claim 1, wherein the subjective familiarity is determined by:
   filtering images related to the user for user specific images;
   training a subjective model with the user specific images; and
   determining the object is subjectively familiar in response to identifying the object with the subjective model.

3. The apparatus of claim 2, wherein the user specific images are acquired from at least one of a social media site and library images identified from a user profile.

4. The apparatus of claim 1, wherein the common familiarity is determined by:
   recognizing the object with a standard object model; and
   assigning the object a common familiarity value associated with the object for the standard object model.

5. The apparatus of claim 1, wherein reducing the render resolution of the object comprises one or more of reducing a number of polygons rendering the object and reducing a complexity of texture maps for the object.

6. A method comprising:
   determining, by use of a processor, an aggregate familiarity of a user with an object as a weighted sum of a common familiarity of the object, a content-specific familiarity of the user with the object, and a subjective familiarity of the user with the object, wherein the content-specific familiarity is calculated as a function of a view time interval that the object is within an area of interest of the user determined by eye tracking, wherein the content-specific familiarity CSF is calculated as $CSF=\max(jVTI^2, h)$, where VTI is the view time interval and j and h are nonzero constants; and
   in response to the aggregate familiarity satisfying a render policy, reducing a render resolution of the object.

7. The method of claim 6, wherein the subjective familiarity is determined by:
   filtering images related to the user for user specific images;
   training a subjective model with the user specific images; and
   determining the object is subjectively familiar in response to identifying the object with the subjective model.

8. The method of claim 7, wherein the user specific images are acquired from at least one of a social media site and library images identified from a user profile.

9. The method of claim 6, wherein the common familiarity is determined by:
   recognizing the object with a standard object model; and
   assigning the object a common familiarity value associated with the object for the standard object model.

10. The method of claim 6, wherein reducing the render resolution of the object comprises one or more of reducing a number of polygons rendering the object and reducing a complexity of texture maps for the object.

11. A computer program product comprising a computer readable storage medium having program instructions embodied therewith, the program instructions readable/executable by a processor to cause the processor to:
    determine an aggregate familiarity of a user with an object as a weighted sum of a common familiarity of the object, a content-specific familiarity of the user with the object, and a subjective familiarity of the user with the object, wherein the content-specific familiarity is calculated as a function of a view time interval that the object is within an area of interest of the user determined by eye tracking, wherein the content-specific familiarity CSF is calculated as $CSF=\max(jVTI^2, h)$, where VTI is the view time interval and j and h are nonzero constants; and
    in response to the aggregate familiarity satisfying a render policy, reduce a render resolution of the object.

12. The computer program product of claim 11, wherein the subjective familiarity is determined by:
    filtering images related to the user for user specific images;
    training a subjective model with the user specific images; and
    determining the object is subjectively familiar in response to identifying the object with the subjective model.

13. The computer program product of claim 12, wherein the user specific images are acquired from at least one of a social media site and library images identified from a user profile.

14. The computer program product of claim 11, wherein the common familiarity is determined by:
    recognizing the object with a standard object model; and
    assigning the object a common familiarity value associated with the object for the standard object model.

* * * * *